Nov. 5, 1968  R. R. BERGQUIST ET AL  3,409,249
COAXIAL RIGID ROTOR HELICOPTER AND METHOD OF FLYING SAME
Filed June 29, 1966  4 Sheets-Sheet 1
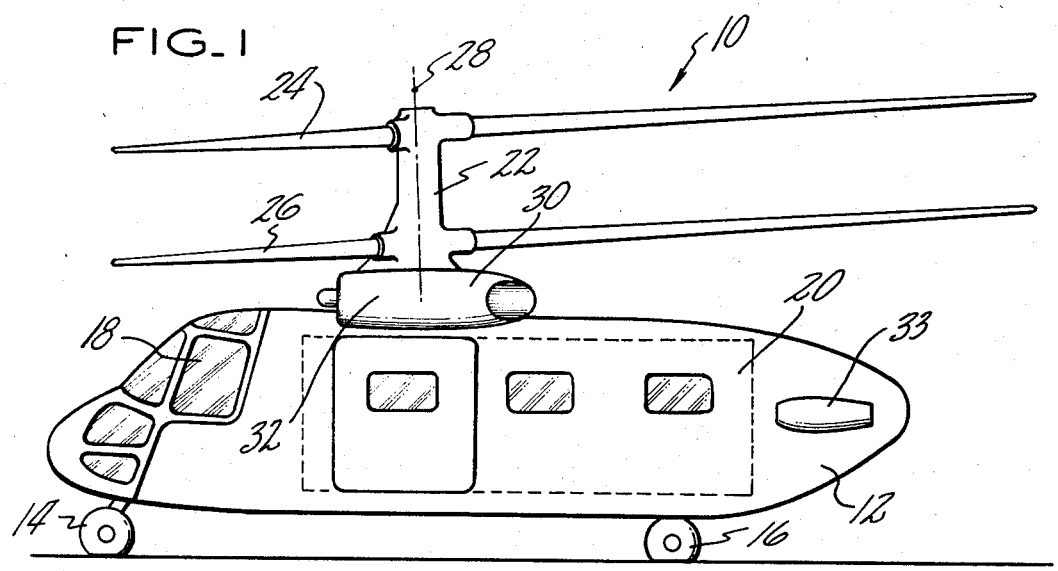
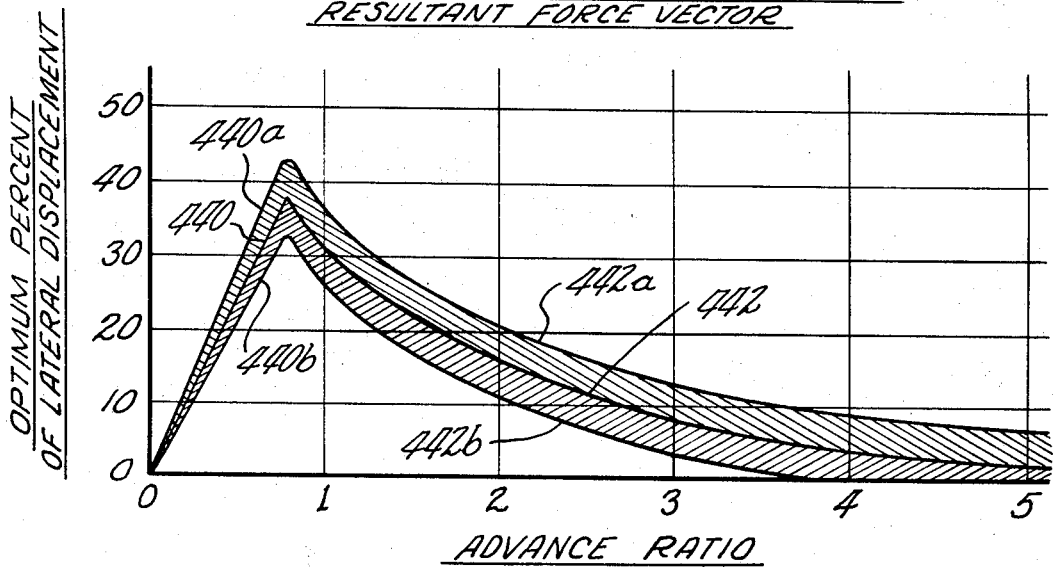
INVENTORS
RUSSELL R. BERGQUIST
PHILIP L. MICHEL
EVAN A. FRADENBURGH
BY Vernon F. Hauschild
ATTORNEY

INVENTORS
RUSSELL R. BERGQUIST
PHILIP L. MICHEL
EVAN A. FRADENBURGH

BY Vernon F. Hauschild
ATTORNEY

INVENTORS
RUSSEL R. BERGQUIST
PHILIP L. MICHEL
EVAN A. FRADENBURGH

BY Vernon F. Hauschild
ATTORNEY

United States Patent Office 3,409,249
Patented Nov. 5, 1968

3,409,249
COAXIAL RIGID ROTOR HELICOPTER AND
METHOD OF FLYING SAME
Russell Raymond Bergquist, Trumbull, Philip L. Michel, Weston, and Evan A. Fradenburgh, Fairfield, Conn., assignors to United Aircraft Corporation, East Hartford, Conn., a corporation of Delaware
Filed June 29, 1966, Ser. No. 561,448
19 Claims. (Cl. 244—17.13)

ABSTRACT OF THE DISCLOSURE

Counter rotating helicopter rotors positioned to establish advancing blade patterns on laterally opposite sides of the helicopter and including means to establish lateral differential cyclic pitch between the helicopter rotors to selectively position the lift vectors of the rotors in offset relation to the axes of the rotors so as to selectively position the lift vectors to produce optimum lift-to-drag ratio for each rotor and to produce cancelling roll moments between the rotors, and the method of operating a helicopter with such rotors.

---

This invention relates to rotary wing aircraft and more particularly to the means and method of fully utilizing the lift potential of the rotor.

In rotary wing aircraft, such as helicopters, the rotor blades are attached to a rotor head which extends from the fuselage and which is supported for rotation about an axis of rotation. The lifting surfaces of the rotating blades or wings produce lift and varying the pitch of the blades produces the helicopter propulsive and maneuvering forces. When a helicopter hovers in flight and the aircraft CG is directly below the rotor center, all blades are rotating in a continuous circle and at the same speed through the air so that a resultant rotor lift vector is generated on the axis of rotation by the rotating blades. Because the axis of rotation of the blades and the lift vector are coincident, no helicopter roll moment is established therebetween. When the helicopter begins to move in a forward direction, the blades travel in the direction of helicopter motion during a portion of their revolution and in a direction opposite to helicopter motion during a portion of their revolution. Accordingly, at any instant of time, some of the blades are moving in the same direction as the helicopter and these are called the advancing blades, while other blades are moving in a direction opposite to helicopter motion and these are called the retreating blades. The advancing blades, because of their greater speed, generate more lift than the retreating blades and, therefore, the resultant rotor lift vector shifts laterally from the axis of rotation toward the tip of the advancing blades and would thereby establish a roll moment which would cause the helicopter to roll over in flight. This, of course, is intolerable and all helicopter manufacturers have solved this roll moment problem by taking steps which partially destroy the lift potential of the advancing blades so that the lift of the advancing blades and the lift of the retreating blades are essentially matched, thereby essentially positioning the resultant rotor lift vector on the rotor axis of rotation. For example, some helicopter rotors are built so that the blades are attached to the rotor head by hinges so as to match the lift of the advancing blades with the lift of the retreating blades and thereby avoid the roll moment. In other helicopters, the blades are rigidly attached to the rotor head but cyclic pitch is applied to the blades so as to match the lift of the advancing blades to the lift of the retreating blades and thereby avoid the roll moment. This cyclic pitch variation has been applied even in a dual, counter-rotating rigid rotor helicopter as taught in U.S. Patent No. 2,473,331.

Contrary to the existing practice of avoiding roll moment by destroying the lift potential of the advancing blades of the helicopter rotor, it is an object of this invention to utilize the full and optimum lift potential of the advancing blades.

It is still a further object of this invention to teach a helicopter rotor system using two, counter-rotating rigid rotors so that the roll moments established by the rotors will cancel. Glauert suggested in his book "Aerodynamic Theory" that this might be done and Payne has suggested in his article "The Maximum Speed of the Helicopter" in the Oct. 14, 1955 issue of Flight Magazine that a wing or offset fuselage CG might be utilized to balance the roll moment of a single rotor. Neither Glauert nor Payne apparently realized, however, that without proper control of collective and cyclic pitch, an angle of attack distribution would result which would be detrimental to the loading of the retreating blades and would give rise to severe Mach number effects on the advancing blades. Overall, this undesirable angle of attack distribution will reduce the lift-to-drag ratio of the rotor and hence the rotor efficiency. We have determined that by selectively positioning the lift vector of the rotor laterally in selected positions between the blade root and the blade tip as the helicopter changes in flight speed, an optimum lift-to-drag ratio can be achieved for each rotor and the roll moment of the rotors can continue to cancel.

It is accordingly an object of this invention to teach means and method for selectively positioning the resultant lift vectors of two, counter-rotating, rigid rotors so as to produce maximum lift-to-drag ratio for each rotor and so that the rotor roll moments will cancel.

It is a further object of this invention to teach a helicopter rotor construction utilizing two, counter-rotating rigid rotors thereby eliminating the need for an anti-torque tail rotor with its gear boxes, drive shaft, coupling and supports and to further eliminate the need for a horizontal tail surface and hence reduce the size of the fuselage structure.

It is still a further object of this invention to teach such a helicopter rotor which eliminates all flap and lag hinges, lag dampers, droop stops and a major portion of the rotor head lubricating system and to thereby reduce the spacing required between the two rotors, the overall weight, complexity and maintenance requirements of the helicopter.

It is still a further object of this invention to teach such a helicopter rotor system having no net angular momentum and no gyroscopic precession and which permits maximum variation of the fuselage center of gravity.

It is still a further object of this invention to teach such a helicopter rotor which is of lower gross weight and lower empty weight than the conventional helicopter, but which can carry the same payload and which is also simpler in design, easier to maintain, capable of higher flight speeds and higher maneuverability, ease of flight and efficiency of hovering than the conventional helicopter.

It is still a further object of this invention to teach such a helicopter rotor which gives superior lift at all flight speeds to the conventional helicopter, and which, due to the increased lift possibilities, permits flight at higher altitudes where the air density is low.

It is still a further object of this invention to teach such a helicopter rotor which permits a coordinated bank angle of at least 60° at all forward flight speeds.

It is still a further object of this invention to teach such a helicopter rotor which may use its superior lift potential to provide superior propulsive force so that auxiliary propulsion is required only above 230 knots.

It is still a further object of this invention to teach such a helicopter rotor system in which the helicopter center of gravity is positioned ahead of the rotor shaft so that the helicopter is flyable and stable without the need of a horizontal tail surface.

It is a further object of this invention to teach such a rotor system in which each counter-rotating rigid rotor includes at least three blades so that the thrust vector remains in a substantially constant position and which rotor blades are preferably made of titanium and taper so that the tip chord is about one-half the root chord, and the airfoil varies from about 30% thickness inboard to about 6% at the tip.

Other features and advantages will be apparent from the specification and claims, and from the accompanying drawings which illustrate an embodiment of the invention.

In the drawings:

FIG. 1 is a showing of a rotary wing aircraft utilizing this invention.

FIG. 8 is a graph showing the position of the resultant rotor lift vector for each of the counter-rotating rotors taught herein for all advance ratios so as to produce optimum lift-to-drag ratio ($L/D$).

Figure 2:
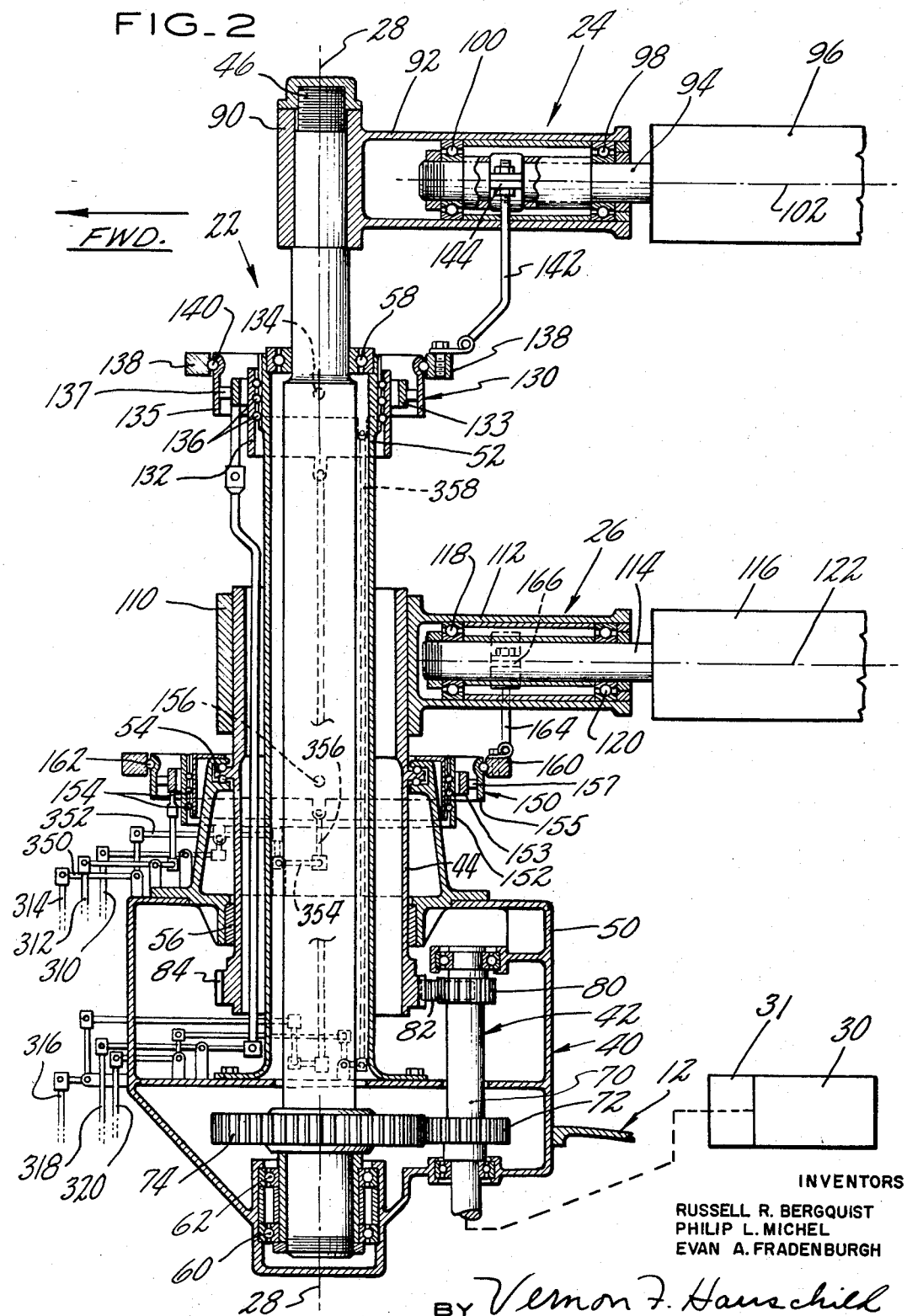
FIG. 2 is a cross-sectional showing of the rotor head taught herein.

Referring to FIG. 1 we see the rotary wing aircraft 10 which is shown as a helicopter. Aircraft 10 includes fuselage 12, which is supported on the ground by any conventional means such as tricycle-type landing gear 14 and 16. Fuselage 12 includes pilot compartment 18 and either cargo or passenger compartment 20. The rotor head 22 projects from fuselage 12 and includes two counter-rotating rigid rotors 24 and 26, each of which is mounted for rotation about an axis of rotation 28. Each rotor 24 and 26 includes at least three blades which are rigidly attached to rotor head 22 so that the only blade motion relative to the rotor head, except flexing, is blade pitch variation. Rotors 24 and 26 are phased so that the blades pass one another over the tail cone of the fuselage. This phasing will maintain the loads of the rotors symmetric about the fuselage axis and reduce vibrations. One or more engines 30 are carried in pods 32, on fuselage 12 and each engine 30 is connected through a variable speed transmission 31 and appropriate gearing to rotor head 22 so as to drive rotors 24 and 26. One or more auxiliary engines 33, either of the jet or propeller type, may be used for auxiliary power above 230 knots flight speed.

Referring to FIG. 2 we see the rotor head 22 in greater particularity. Rotor head 22 projects from and is supported by fuselage 12. Rotor unit 22 comprises housing 40, which is supported by fuselage 12, drive gear train 42, outer drive shaft 44, inner drive shaft 46 and rotors 24 and 26.

Housing 40 comprises outer fixed housing 50 and inner fixed housing 52. Bearings 54 and 56 extend between fixed outer housing 50 and outer drive shaft 44 to support outer drive shaft 44 for rotation within fixed housing 50 about axis of rotation 28. Bearings 58, 60 and 62 are positioned between inner fixed housing 52, outer fixed housing 50, and inner drive shaft 46 to support inner drive shaft 46 for rotation within fixed housing 52 about axis of rotation 28. Drive gear train 42 includes drive gear 70, which is driven by engine or engines 30 and which includes gear 72 which meshes with gear 74 of inner drive shaft 46 so as to cause the inner drive shaft 46 to rotate about axis of rotation 28. Drive gear 70 also includes gear 80 which, through idler gear 82, drives gear 84 of outer drive shaft 44 so as to cause outer drive shaft 44 to rotate about the axis of rotation 28 in a direction opposite to the direction of rotation of inner drive shaft 46. It will be evident that the gearing of drive gear train 42 can be selected so that rotors 24 and 26 rotate in opposite directions and at the same rotational speed, that is, the same number of revolutions per minute.

Rotor 24 includes a hub 90 which is mounted on and connected to inner drive shaft 46 for rotation therewith about axis 28. Hub 90 includes at least three sleeves 92, preferably equally spaced, which project from hub 90. The root end 94 of each rotor blade 96 is received in a sleeve 92 and is supported therefrom by pitch change bearings 98 and 100 so as to be pivotable about pitch change axis 102.

Rotor 26 includes hub 110 which has at least three equally spaced sleeves 112 projecting therefrom. Each sleeve receives the root end 114 of a rotor blade 116 so that the blade 116 is supported in sleeve 112 by pitch change bearings 118 and 120 so as to be rotatable about pitch change axis 122.

It will be noted that blades 96 and 116 are rigidly attached to hubs 90 and 110, respectively, so that rotors 24 and 26 are said to be rigid rotors. There are no blade hinges or flex members which allow substantial "flapping" motion of the blades.

The blades 96 and 116 of both rotors 24 and 26 may be caused to vary pitch both collectively and cyclically by conventional swash plate mechanism. Swash plate or gimbal mechanism 130 is attached to inner fixed housing 52 and includes ring member 132 which may be translated along axis 28. Bearing 136 is positioned between ring member 132 and fixed housing 52 so as to prevent rotation of ring member 132 about the axis of rotation 28 but to permit translation of ring member 132 along axis 28. Swash plate mechanism 130 also includes inner gimbal ring 133 which is pivotable about axis 134, outer gimbal ring 135 which is pivotable about axis 137, and ring member 138, which is supported from ring member 135 by bearing 140 for rotation with blades 96 about axis 28. Link 142 extends from ring member 138 and pivotally connects to pitch change horn 144 of blade 96 so as to change the pitch of blade 96 in accordance with the motions of swash plate member 130. A link corresponding to 142 extends from ring 138 of swash plate mechanism 130 and pivotally connects to a pitch change horn member 144 on each of the three or more blades 96 of rotor 24.

Swash plate or gimbal mechanism 150 is similar to swash plate mechanism 130 and is mounted on outer fixed housing 50 to vary the pitch of the three or more blades 116 of rotor 26. Swash plate mechanism 150 includes ring member 152 which is connected to housing 50 through bearings 154 in such a fashion that ring member 152 is restrained from rotating about axis 28 but is free to translate along axis 28. Swash plate mechanism 150 also includes inner gimbal ring 153 which is pivotable about axis 156, outer gimbal ring 155 which is pivotable about axis 157 and ring member 160 which is supported by bearing 162 from ring member 155, so as to be rotatable with blades 116 about axis 28. A link such as 164 projects from ring member 160 and pivotally connects to pitch change horn 166 on each of the three or more blades 116 of rotor 26.

The manner and mechanism for moving swash plate mechanisms 130 and 150 so as to effect collective and cyclic pitch variation of the blades of rotors 24 and 26 will be described hereinafter in connection with the description of FIG. 3.

Figure 3:
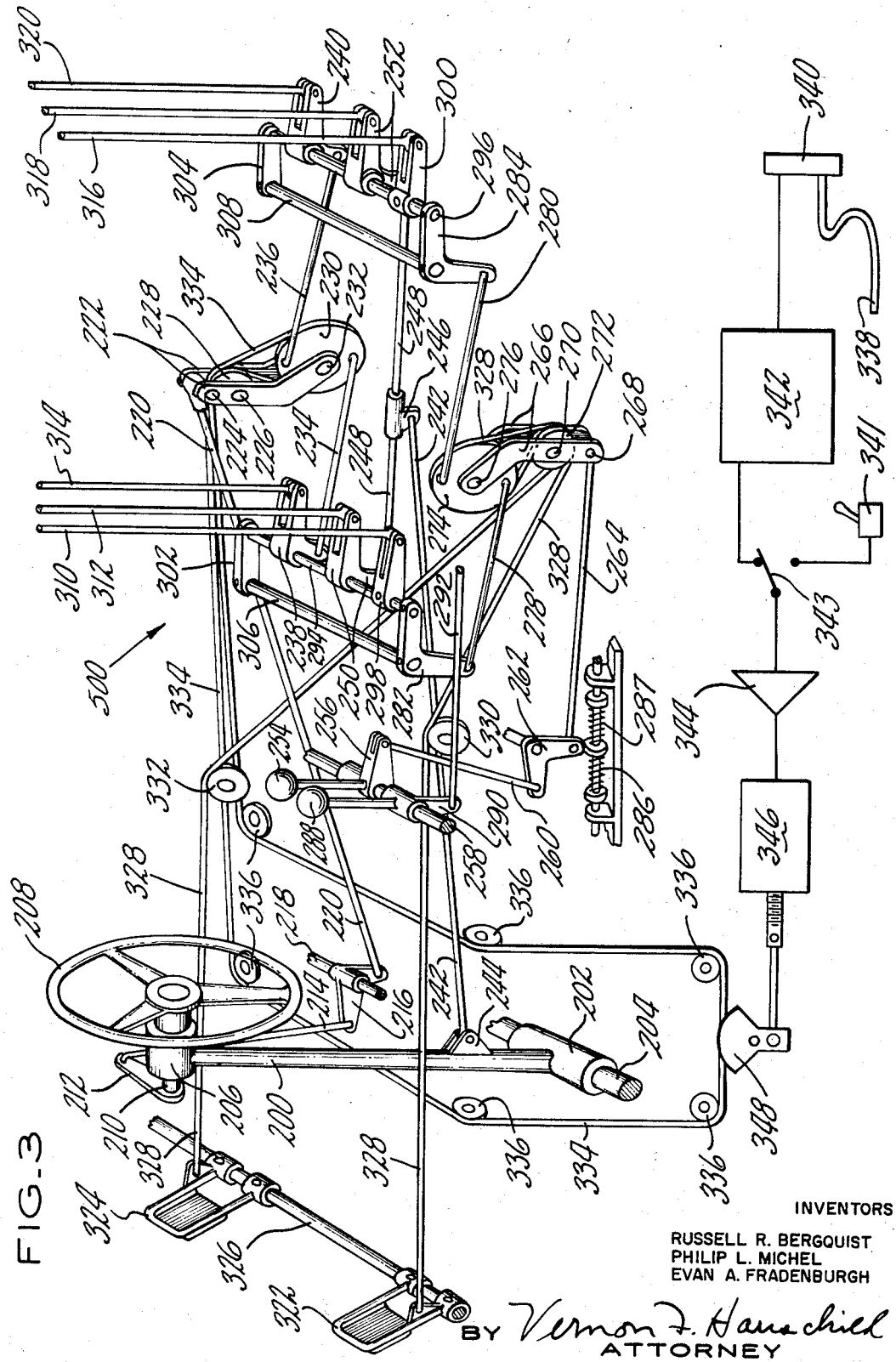
FIG. 3 illustrates the rotor blade pitch controls for this rotor unit.

The controls and mixing linkage 500 for this helicopter are shown in greater particularity in FIG. 3. Upright control post 200 rigidly fastened in sleeve 202 is pivotally mounted on shaft 204. Shaft 204 is rigidly fixed to the airframe. Integrally connected with control post 200 at the top is a bearing support housing 206. Control wheel 208 is fixed to one end of shaft 210 which is pivotally mounted in housing 206 and lever 212 is rigidly fixed to the opposite end of shaft 210. Rod 214 connects to bellcrank 216 which is pivotally mounted to the airframe by means of shaft 218. Rod 220 connects bellcrank 216 to lever arms 222 at 224. Lever arms 222 are pivotally mounted to the airframe by means of shaft 226. Double pulley 228 is freely rotatable on shaft 226 between the lever arms 222. Wheel 230 is rotatably mounted between lever arms 222 on shaft 232. Rods 234 and 236 extend from the periphery of wheel 230 and connect respectively to bellcranks 238 and 240. Rotation of wheel 208 will translate wheel 230 fore and aft about shaft 226 and move bellcranks 238 and 240 in unison.

Rod 242 extends from connection 244 on post 200 to lug 246 clamped at the midpoint of rod 248. Rod 248 connects at its ends to bellcranks 250 and 252, respectively. Motion of control post 200 fore and aft will move bellcranks 250 and 252 in unison.

Control handle 254 rigidly connected to lever 256 is pivotally mounted to the airframe on shaft 258. Rod 260 connects lever 256 to bellcrank 262. Rod 264 actuated by bellcrank 262 connects to upright lever arms 266 at 268. Arms 266 are pivotally mounted to the airframe by means of shaft 270. Double pulley 272 is freely rotatable on shaft 270 and is positioned between the upright lever arms 266. Wheel 274 is rotatably mounted between upright lever arms 266 at 276 and extending from the periphery of wheel 274 are rods 278 and 280 which connect respectively to bellcranks 282 and 284.

Biasing springs 286 and 287 rigidly mounted to the airframe, engage an extension of bellcrank 262 and consequently urge control handle 254 to a neutral position.

Immediately adjacent to control handle 254 is throttle control handle 288 also rotatably mounted on shaft 258. Lever 290 rigidly connected with throttle control handle 288 operates rod 292 which is connected to the engines 30 (FIG. 1).

In reference to the bellcrank mixing linkage 500, it will be noted that bellcranks 238 and 250 are pivotally mounted on shaft 294 and bellcranks 240 and 252 are pivotally mounted on shaft 296. Lever arms 298 and 300 are pinned to shafts 294 and 296, respectively, and the shafts in turn are pinned in their connections with bellcranks 282 and 284, respectively, and support arms 302 and 304, respectively. Shafts 306 and 308 are pinned to the corresponding bellcranks and support arms and are rotatably mounted in the airframe. From this construction, it will be clear that rotation of bellcranks 282 and 284 by control handle 254 will cause the bellcranks and levers suspended upon shafts 294 and 296 and the associated push rods 310, 312, 314, 316, 318, 320 to rise or descend in unison.

Foot pedals 322 and 324 are pivotally mounted on shaft 326 which is rigidly fixed to the airframe. Cable 328 runs from pedal 322 over idler pulley 330 and one sheave of the double pulley 272, peripherally engages wheel 274, and runs back over the other sheave of double pulley 272 to pedal 324 by way of idler pulley 332. Motion of pedals 322 and 324 will rotate wheel 274 and cause bellcranks 282 and 284 with their respective push rod assemblies to move in opposite directions. The foot pedals, therefore, cause the push rods 310, 312, and 314 to move differentially with respect to push rods 316, 318 and 320.

External pitot tube 338 forms a portion of a Q-sensor 340. The Q-sensor 340 supplies an electrical speed signal to computer 342. Computer 342 operates upon this signal in a manner to be described hereinafter and (through amplifier 344) drives jackscrew servomotor 346. Alternatively, the computer 342 can be disconnected by switch 343 and the pilot can operate the servomotor 346 by means of his beeper switch 341. The servomotor 346 is in turn operatively connected to cable 334 through link 348. Cable 334 runs over one sheave of double pulley 228, peripherally engages wheel 230, runs back over the other sheave of double pulley 228 and forms a loop with pulleys 336. Motion of cable 334 will rotate wheel 230 and cause bellcranks 238 and 240 with their respective push rods 314 and 320 to move in opposite directions. Therefore, operation of cable 334 by means of a Q-sensor 340 or beeper switch 341, will cause the push rods 314 and 320 to move differentially.

Push rods 310, 312, 314, 316, 318 and 320 operated from the mixing linkage 500 of FIG. 3 are shown connected to the gimbal ring or swash plate assemblies 130 and 150 in FIG. 2. Push rod 314 is connected through bellcrank 350, rod 352, bellcrank 354 and rod 356 to the outer gimbal ring 155 of assembly 150. By similar linkage, push rods 312 and 310 are connected respectively to the inner gimbal rig 153 and the slideable sleeve 152. It will be understood that rods 310, 312, and 314 will determine the plane of the ring 160 by tilting the gimbal rings 153 and 155 about the gimbal axes 156 and 157 and by axially translating ring 152 along the vertical housing 50. With rods 164 connected to the blade pitch horns 166, the push rods 310, 312, and 314 control the cyclic and collective pitch on the lower rotor 26. Similarly, push rods 316, 318, and 320 control the plane of ring 138 of the swash plate or gimbal assembly 130. The linkage 358 from push rod 320 would normally connect to ring 135 at a point ninety degrees from axis 137 but the linkage 358 is shown slightly out of position for clairty. For a more complete description of the control linkages, reference may be had to U.S. Patent No. 2,473,-331. Tilting and translating the gimbal rings on the housing 52 by means of push rods 316, 318 and 320 control the cyclic and collective pitch of the upper rotor 24.

It will be understood by reference to the pilot's controls in FIG. 3 and the rotors in FIG. 2 that the collective pitch of both rotors is increased or decreased by actuation of control handle 254. This actuation will cause wheel 274 to translate fore or aft as lever arms 266 rotate about pivot 270 and all push rods 310, 312, 314, 316, 318 and 320 will move up or down in unison to increase or decrease collective pitch on both rotors 24 and 26. Differential collective pitch, that is, addition of collective pitch to one rotor and subtraction of collective pitch from another, changes the aerodynamic torque on each rotor for yaw control. Differential collective pitch is accomplished by motion of the foot pedals and cable 328 which cause wheel 274 to rotate and hence differentially operate the push rods of the upper and lower rotors. Of course, alternate systems for yaw control may be employed, such as the rotor blade tip brakes shown in U.S. Patent No. 2,835,331, or a small yaw control rotor, or an exhaust gas deflection nozzle displaced from the main rotor system.

Forward cyclic pitch is applied to both rotors by motion of control post 200 which through bellcranks 250 and 252 yields an output at control rods 312 and 318. Rods 312 and 318 tilt their respective swash plate assemblies forward.

In a manner similar to the collective control mechanism, rotation of control wheel 208 applies the same lateral cyclic, e.g., right lateral cyclic, to each rotor for roll control. Wheel 230 will translate fore and aft to move push rods 314 and 320 in unison and thereby tilt both swash plate assemblies 130 and 150 toward one side or the other. Differential lateral cyclic pitch is accomplished through the operation of cable 334 and rotation of wheel 230 which will move rods 314 and 320 differentially and thereby tilt swash plate assemblies 130 and 150 toward opposite sides.

The amount of differential lateral cyclic pitch will be controlled as a function of speed through pitot tube 338 and computer 342 which operate the servomotor 346 and cable 334. Differential lateral cyclic may be controlled at will by the pilot through the beeper switch 341.

It is a very important teaching of this invention that the rotors 24 and 26 include at least three blades so as to permit the stable positioning of the resultant rotor lift vector of the rotors 24 and 26 with respect to the axis of rotation 28. If a two-bladed rotor were used, intolerable vibration and stress variations would be set up in rotor unit 22 as the resultant rotor lift vector moved between a maximum offset position and the axis of rotation 28 twice for each rotor revolution. This would occur because, when the two-bladed rotor is in its fore and aft position, the lift vector must of necessity return to the axis of rotation 28.

In a three-bladed rotor system the vibrations are further minimized by phasing the rotors so that the blades pass one another over the tail cone. With this phasing, the loads on opposite sides of the fuselage are symmetric, and any moments generated by these loads are mutually cancelling. Vibrations between the two rotors are, therefore, cancelled within the rotor systems themselves and are not transmitted to the aircraft fuselage.

While many new materials are being developed today, it appears that our rotor blades should preferably be made of titanium. Titanium is only 60% heavier than aluminum, but its allowable alternating stress for infinite life is at least three times as high. Titanium has at least the same allowable alternating stress as steel, but its weight is only 60% that of steel.

To reduce blade tip deflection, conventional tip weights may be added to the blades. An alternative is to distribute the added weight to achieve a similar result. We have found that the titanium blade is best suited for this rotor system when the tip chord is about ½ the root chord and the air-foil varies from about 30% thickness inboard to about 6% at the tip. In the region of the feathering bearings, the thickness is increased to 40% to keep vibratory stresses to a minimum.

Figure 4:
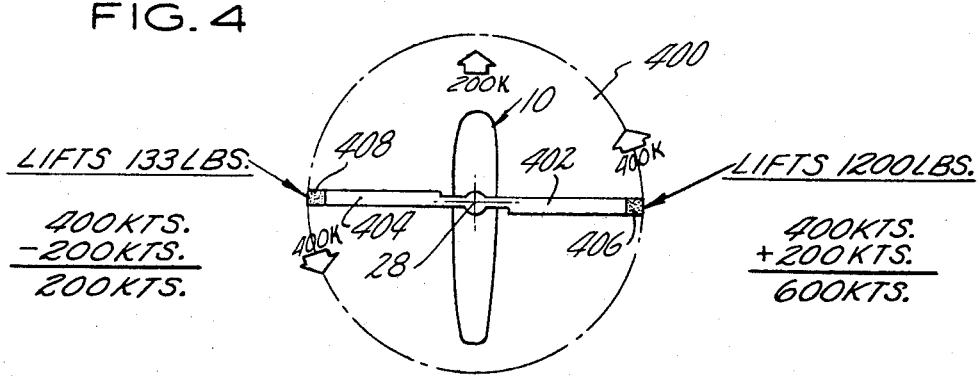
FIG. 4 is a schematic diagram showing a helicopter in flight and demonstrating the lift variation between the advancing and retreating blades.

The substantial advantage of this rotor system is best realized by considering FIGS. 4–7. First referring to FIG. 4 we see a rotor disc 400 generated by the rotation of the rotor blades of helicopter 10 about the axis of rotation 28. The helicoper 10 is illustrated to be flying in a forward direction at 200 knots and the rotor blades are presumed to have a tip speed of 400 knots. The rotor blades are shown to be rotating in a continuous circle in the direction of the arrows so that blade 402 is the advancing blade and blade 404 is the retreating blade. Considering one square foot of lift surface at the tip 406 of advancing blade 402 and one square foot of lift surface at the tip 408 of retreating blade 404, FIG. 4 illustrates the drastic difference in lift potential between the advancing and retreating blade. Since the tip 406 of the advancing blade 402 has a combined velocity of both the rotational tip speed of the blades and the forward velocity of the helicopter, it will be seen that the relative speed of tip 406 of the advancing blade 402 is 600 knots. Since tip 408 of the retreating blade 404 is moving in the opposite direction to the motion of helicopter 10, the relative speed of tip 408 is the difference between tip speed and helicopter speed or 200 knots. Accordingly, the advancing blade tip is moving three times faster than the retreating blade tip. This difference in relative motion is amplified in the lift generating potential of the advancing and retreating blades since lift is proportional to the square of the speed of the lifting surface. Calculations will therefore show that the advancing tip 406 generates, for example, 1,200 pounds of lift while the retreating blade tip 408 generates only 133 pounds of lift. This lift potential difference amounts to a factor of about 9. If the calculations are applied to the entire advancing blade and the entire retreating blade, as opposed to the tips only, it can be shown that the advancing blade 402 generates about 10 times the lift of the retreating blade 404.

Figure 5:
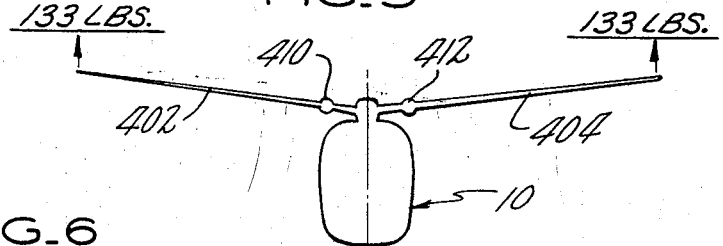
FIG. 5 is a schematic representation of a conventional aircraft showing hinged rotor blades and illustrating the lift of the advancing blades being limited to the lift of the retreating blades.

Unfortunately, current practice is to destroy approximately 89% of the lift potential of the advancing blade by limiting the lift of the advancing blade to the lift of the retreating blade either by the use of hinges 410 and 412 between the blades and the hub as illustrated in FIG. 5, and shown in greater particularity in U.S. Patent No. 3,217,811 or by varying the pitch of the advancing and retreating blades to equalize their lift potential as more particularly described in U.S. Patent No. 2,473,331.

Contrary to this, with rotor unit taught herein, the full lift potential of the advancing blades can be realized. This is best illustrated in FIG. 6 in which the full 1,200 pound lift potential of the advancing blade of rotor 24 and rotor 26 is generated on opposite sides of the axis of rotation 28 to produce cancelling roll moments.

The significance of the advantage of the increased lift potential of the rotor system taught herein over the conventional rotor systems discussed above is best illustrated in FIG. 7 in which curve 420 represents the conventional helicopter and curve 422 represents the helicopter using the rotor system taught herein. It will be noted that in the conventional helicopter, lift falls off rapidly as speed increases and that at a certain speed indicated at point 424, for example, the rotor cannot support the helicopter weight. This is why the conventional helicopter need be compounded by adding wings to achieve lift at high speeds. Contrary to this, in the rotor system taught herein, lift increases with speed so that at all speeds up to and above 400 knots, the lift exceeds the helicopter weight, thereby eliminating the need of wings at high speeds. The break in curve 422 occurs because the rotor speed is reduced above 200 knots to keep the advancing blade tip speed Mach number below the 0.9 value. Nevertheless, the lift continues to increase despite the reduction in tip speed. It will be evident to those skilled in the art that there are many advantages to be gained by the increased lift potential, such as flights at high altitudes, increased maneuverability, increased range and cruise speed to mention a few.

Figure 6:
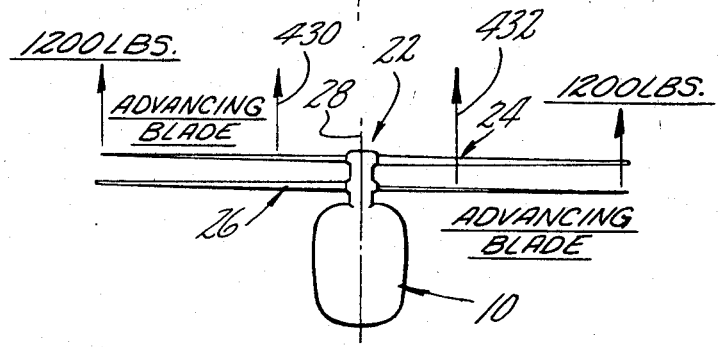
FIG. 6 is a schematic showing of the helicopter system of this invention and illustrating both rotors achieving optimum advancing blade lift potential.
Figure 7:
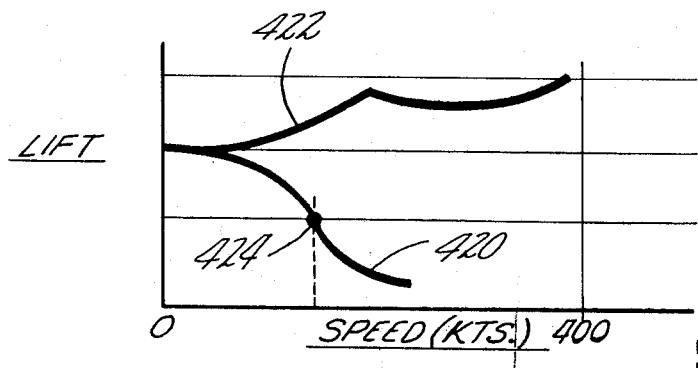
FIG. 7 is a graphic representation of the lift potential of the rotor system taught herein as compared to the lift potential of the conventional helicopters.

We have found that if the resultant rotor lift vectors, such as illustrated as 430 and 432 in FIG. 6 are not positively controlled during forward flight, they will proceed toward the tip of the advancing blades and the undesirable angle of attack distribution on both the advancing and retreating blades will diminish the lift-to-drag ratio $(L/D)$ of the rotor. Accordingly, it is an important teaching of this invention to selectively position the resultant lift vector of the two rotors such that they are always equal distances from the axis of rotation 28 and of equal magnitude so as to produce cancelling roll moments and so that they produce an optimum $L/D$ for each rotor. For example, we have found that for a given ratio the optimum $L/D$ is obtained when the resultant lift vector is located at 17% of the blade radius when the forward flight of the helicopter is 150 knots and at 40% of the blade radius when the forward flight of the helicopter is 270 knots.

FIG. 8 is a graph giving the optimum lateral displacement of the rotor lift vector for each advance ratio, that is, the ratio of helicopter forward speed to blade tip rotational speed. The curve of FIG. 8 in the region 440 represents the equation:

$$P = 47\mu; \text{ where } 0 \leq \mu \leq .8$$

where P is the optimum lateral displacement of the rotor lift vector in percent of the rotor disc radius and where $\mu$ is the advance ratio.

The portion of the FIG. 8 curve designated as 442 represents the equation:

$$P = 37.5 e^{[.7(.8-\mu)]}; \text{ where } \mu > .8$$

where P is the optimum lateral displacement of the rotor lift vector in percent of the rotor blade disc radius, $\mu$ is the advance ratio, and $e$ the base of natural logarithms.

It will be seen from FIG. 8 that the optimum lateral displacement is zero at zero advance ratio, that is when the helicopter is hovering, since no forward speed exists to cause unsymmetrical air loading or lift. The optimum displacement of the lift vector then increases with advance ratio until a maximum occurs in the vicinity of 0.8. To generate lift offset vectors as far away from the rotor center as 40% or 50% radius, the rotor blades must not be allowed to flap as in conventional helicopters. For this reason there are no blade hinges or flexible support members in the blade attachments. The blades, being very rigid or stiff, can then carry the large offsets necessary for optimum $L/D$ ratios.

Because of the large number of parameters involved such as blade twist, blade taper and disc loading, the curve defined in FIG. 8 should properly be extended thereby between the designated bands 440a and 440b; and 442a and 442b. The corresponding equations for these bands are:

$P=53\mu$ and $P=40\mu$ where $0\leq\mu\leq.8$; and
$P=37.5e^{[.7(.8-\mu)]}+5$ and
$P=37.5e^{[.7(.8-\mu)]}-5$ where $\mu>.8$

OPERATION

Because the lift vector will naturally and rapidly shift laterally outboard as forward speed increases, it is necessary to supply lateral cyclic pitch to each rotor to control the position of the lift vector. Since the rotors are turning in opposite directions, the advancing blades appear on opposite sides of the aircraft longitudinal axis. The lift vectors of the respective rotors will move toward opposite sides of the aircraft; therefore, a differential lateral cyclic control system, as described above, is needed. The lateral cyclic control applied to one rotor will be the opposite of that applied to the other rotor. For example, if the upper rotor has the advancing blade on the right-hand side, left lateral cyclic will be necessary to prevent the lift vector from shifting too rapidly to the right. On the lower rotor, rotating in the opposite direction, the advancing blade is on the left and, therefore, right lateral cyclic pitch will be necessary to prevent the lift vector from shifting too rapidly to the left.

The amount of lift vector offset will vary as a function of speed according to the given equations:

$P=47\mu$ where $0\leq\mu\leq0.8$, and
$P=37.5e^{[.7(.8-\mu)]}$ where $\mu>0.8$

The variable P is a normalized position so that it applies to a rotor of any diameter. The advance ratio is:

$$\mu=V/\Omega R$$

where V is velocity of the helicopter, $\Omega$ is the rotational speed of the rotor and R is the radius of the rotor. The non-dimensional advance ratio $\mu$ applies to a rotor of any size and represents the speed factor in the equation.

As a practical matter, it will be recognized that the speed signal supplied to the computer 342 must be translated by the computer into a quantity proportional to lateral cyclic pitch and not lift vector offset. Since the amount of lateral cyclic pitch necessary to offset the lift vector is a function of the specific rotor, the exact mathematical operation of the computer will vary from rotor system to rotor system. However, individual manufacturers will be capable of determining how much lateral cyclic pitch is necessary for a given offset in their rotor systems. From the teachings of this invention the amount of lateral cyclic necessary for optimum lift vector offset can be determined. The computer will then be programmed to accept the velocity signal and apply lateral cyclic pitch accordingly.

In flight, this application of lateral cyclic pitch to each rotor will be accomplished automatically by the speed-sensing pitot tube 338 and the computer 342. The pilot, therefore, can fly his helicopter without reference to any special controls for optimization of the $L/D$ ratio. In the event that the pilot wishes to override the computer or command a different differential lateral cyclic pitch, he can disconnect the computer and control the servomotor 346 through his beeper swtich 341.

In order to avoid high drag coefficients associated with blade tip speed Mach numbers over 0.9, it is necessary to reduce the tip speed as the helicopter forward speed increases. This reduction will continue until the rotor is completely stopped at a high forward speed and the helicopter will then fly as a fixed wing aircraft. After this transition to fixed wing flight occurs, the loading is again symmetrical and the lift vector displacement is zero.

A mechanism such as a variable speed transmission 31 or a variable speed engine can be used to reduce rotor speed as fixed wing flight is approached. It will be recognized that the rigid coaxial system has unique advantages which obviate the transition problems normally associated with conversion of a rotor to a fixed wing. The significant problem in most systems is that there is a period in the transition sequence during which the rotor cannot produce the required lift because of the slow airspeed of the retreating blade. A permanently fixed wing can be added but wings impede rotor downwash in hover and slow speed flight. Wings reduce efficiency and their weight subtracts from the useful load. There is no need for wings in this rigid coaxial rotor system. The speed of the aircraft can be increased by an auxiliary propulsion device 33 while the rotational speed of the rotors is proportionally decreased. The airspeed of the advancing blades on both sides of the aircraft will remain constant and, therefore, equal lifts will be generated by the rigid blades. The rotor can be brought entirely through this transition phase to fixed wing flight without lateral unbalance. The transition period, therefore, does not pose the lateral unbalance problem because of the unique character of the rigid coaxial design.

The embodiments of the invention in which an exclusive property or privilege is claimed are defined as follows:

1. In a helicopter,
    (a) a fuselage,
    (b) a rotor hub projecting from said fuselage,
    (c) means supporting said rotor hub from said fuselage for rotation about an axis of rotation,
    (d) at least three blades extending from said rotor hub and cooperating therewith to form a lift rotor and mounted for rotation therewith about said axis of rotation,
    (e) means connected to said lift rotor to cause said lift rotor to rotate about said axis of rotation to generate lift and thereby produce a resultant rotor lift vector,
    (f) means to selectively position the resultant rotor lift vector between said axis of rotation and the blade tips to produce optimum lift-to-drag ratio substantially in accordance with the formula:

$P=47\mu$; where $0\leq\mu\leq.8$ and
    $P=37.5e^{[.7(.8-\mu)]}$; where $\mu>.8$ where P is the resultant rotor lift vector offset in percent of rotor radius, $\mu$ is the advance ratio, i.e., the ratio of helicopter forward speed to rotational blade tip speed, and e is the base of the natural logarithms,
    (g) and means to cancel the roll moment established by the resultant rotor lift vector so offset.

2. Apparatus according to claim 1 and wherein said blades are rigidly attached to said hub.

3. In an aircraft having a fuselage,
    (a) two counter-rotating lift rotors positioned to present advancing blade patterns on opposite lateral sides of the helicopter to thereby produce laterally opposed rotor resultant lift vectors,
    (b) means to cyclically vary the pitch of the blades of the rotors so that the lift vectors of each of the rotors are optimally offset from the axes of rotation of the rotors on oppoiste lateral sides of the helicopter so as to produce substantially maximum lift-to-drag ratio and, further, so that the roll moments produced by the optimally offset lift vectors of each rotor are cancelled,
    (c) and auxiliary craft propulsion means supported by said fuselage.

4. Apparatus according to claim 3 and including means to selectively position said offset lift vectors substantially in accordance with the formula:

$P=47\mu$; where $0\leq\mu\leq.8$ and
$P=37.5e^{[.7(.8-\mu)]}$; where $\mu>.8$ where P is the rotor resultant lift vector offset in percent of rotor radius, $\mu$ is the advance ratio, i.e., the ratio of helicopter forward speed to rotational blade tip speed, and $e$ is the base of the natural logarithms.

5. In an aircraft having a fuselage,
   (a) two counter-rotating lift rotors positioned to present advancing blade patterns on opposite lateral sides of the helicopter to thereby produce laterally opposed rotor resultant lift vectors,
   (b) means to cyclically vary the pitch of the blades of the rotors so that the roll moments produced by the offset lift vectors are cancelled,
   (c) and auxiliary craft propulsion means supported by said fuselage,
   (d) and including means to reduce the speed of rotation of said rotors so that the rotor tip speed does not exceed Mach 0.9 so that the rotor blades will eventually stop in high speed flight and the craft will operate as a fixed wing craft propelled by said auxiliary propulsion means.

6. In an aircraft having a fuselage,
   (a) two counter-rotating lift rotors positioned to present advancing blade patterns on opposite lateral sides of the helicopter to thereby produce laterally opposed rotor resultant lift vectors,
   (b) means to cyclically vary the pitch of the blades of the rotors so that the roll moments produced by the offset lift vectors are cancelled,
   (c) and auxiliary craft propulsion means supported by said fuselage,
   (d) and including means to selectively position said offset lift vectors substantially in accordance with the formula:

$P = 47\mu$; where $0 \leq \mu \leq .8$ and
   $P = 37.5 e^{[.7(.8-\mu)]}$; where $\mu > .8$ where P is the rotor resultant lift vector offset in percent of rotor radius, $\mu$ is the advance ratio, i.e., the ratio of helicopter forward speed to rotational blade tip speed, and $e$ is the base of the natural logarithms,
   (e) and still further including means to reduce the speed of rotation of said rotors so that the rotor tip speed does not exceed Mach 0.9 so that the rotor blades will eventually stop in high speed flight and the craft will operate as a fixed wing craft propelled by said auxiliary propulsion means.

7. In combination in a helicopter,
   (a) a fuselage,
   (b) a first rotor head projecting from said fuselage,
   (c) a second rotor head projecting from said fuselage,
   (d) at least three stiff rotor blades extending from each of said rotor heads and coacting therewith to form first and second lift rotors,
   (e) means connecting each of said blades to one of said rotor heads so that each blade is rigidly attached to the rotor head and is capable of pitch change only with respect thereto,
   (f) control means to cause the pitch of the blades of said first lift rotor to vary collectively,
   (g) control means to cause the pitch of the blades of said second lift rotor to vary collectively,
   (g) control means to cause the pitch of the blades of said second lift rotor to vary collectively,
   (h) control means to cause the pitch of the blades of said first rotor to vary cyclically,
   (i) control means to vary the pitch of the blades of said second lift rotor cyclically,
   (j) and speed responsive control means to cause the pitch of the blades of the first rotor to vary cyclically to establish a laterally offset resultant rotor lift vector and hence a roll moment and to cause the pitch of the blades of the second lift rotor to vary cyclically to establish a laterally offset resultant rotor lift vector positioned to cancel the roll moment of the first lift rotor.

8. Apparatus according to claim 7 wherein said speed responsive control means causes the resultant lift vector of said first and second lift rotors to be displaced laterally in opposite directions and in equal amounts substantially according to the formula:

$P = 47\mu$; where $0 \leq \mu \leq .8$ and
   $P = 37.5 e^{[.7(.8-\mu)]}$; where $\mu > .8$ where P is the rotor resultant lift vector offset in percent of rotor radius, $\mu$ is the advance ratio, i.e., the ratio of helicopter forward speed to rotational blade tip speed, and $e$ is the base of the natural logarithms.

9. In a helicopter,
   (a) a fuselage,
   (b) a first lift rotor extending from said fuselage and having at least three rotor blades projecting therefrom and moveable in pitch change motion only,
   (c) a second lift rotor extending from said fuselage and having at least three rotor blades projecting therefrom and moveable in pitch change motion only,
   (d) means to cause said rotors to rotate in opposite directions,
   (e) first swash plate-type means connected to the blades of said first rotor to vary the pitch thereof,
   (f) second swash plate-type means connected to the blades of said second rotor to vary the pitch thereof,
   (g) control means to cause said first swash plate-type member to translate and vary the pitch of the blades of said first rotor collectively,
   (h) control means to cause said second swash plate-type member to translate and vary the pitch of the blades of said second rotor collectively,
   (i) control means to cause said first swash plate-type means to tilt and thereby vary the pitch of the blades of said first rotor cyclically,
   (j) control means to cause said second swash plate-type member to tilt and thereby vary the pitch of the blades of said second rotor cyclically,
   (k) and speed responsive control means to cause said swash plate-type members to tilt in opposite directions to thereby produce differential lateral cyclic pitch between the blades of said first and second rotors to establish laterally offset lift vectors in said rotors to thereby establish cancelling roll moments.

10. Apparatus according to claim 9 wherein the lateral displacement of the lift vector established by said speed responsive control means for each of said rotors is substantially according with the formula:

$P = 47\mu$; where $0 \leq \mu \leq .8$ and
    $P = 37.5 e^{[.7(.8-\mu)]}$; where $\mu > .8$ where P is the rotor resultant lift vector offset in percent of rotor radius, $\mu$ is the advance ratio, i.e., the ratio of helicopter forward speed to rotational blade tip speed, and $e$ is the base of the natural logarithms.

11. In an aircraft,
    (a) two counter-rotating lift rotors positioned to present advancing blade patterns on opposite lateral sides of the helicopter to thereby produce laterally opposed resultant rotor lift vectors,
    (b) and means to cyclically vary the pitch of the blades of the rotors to selectively position the lift vectors in offset relation to the axes of rotation of the rotors to control the lift-to-drag ratio of the rotors and produce cancelling roll moments.

12. In a helicopter having counter-rotating rotors, the method of optimizing lift-to-drag ratio of the rotors comprising, causing the rotors to rotate about their axes of rotation, varying the angle of attack of the rotor blades to establish forward flight speed and to cause the resultant rotor lift vector of each rotor to become offset as a function of flight speed substantially uniformly between the axis of rotation of each rotor at hover and about 40% of the rotor radius at 275 knots flight speed and in equal and opposite amounts to produce zero roll moment.

13. In combination in an aircraft having a fuselage,
   (a) two counter-rotating lift rotors each having at least three blades phased so that corresponding blades of each rotor pass over the rear portion of said fuselage,
   (b) means to control the pitch of each rotor cyclically to move the helicopter laterally,
   (c) means to control the pitch of each rotor cyclically to move the helicopter longitudinally,
   (d) and speed responsive means to cause equal and opposite lateral lift offset in said rotors substantially in accordance with the following formula:

$$P=47\mu; \text{ where } 0\leq\mu\leq.8 \text{ and}$$
$$P=37.5e^{[.7(.8-\mu)]}; \text{ where } \mu>.8$$

where P is the rotor resultant lift vector offset in percent of rotor radius, $\mu$ is the advance ratio, i.e., the ratio of helicopter forward speed to rotational blade tip speed, and $e$ is the base of the natural logarithms.

14. In a helicopter,
   (a) a fuselage,
   (b) a rotor hub projecting from said fuselage,
   (c) means suporting said rotor hub from said fuselage for rotation about an axis of rotation,
   (d) at least three blades extending from said rotor hub and cooperating therewith to form a lift rotor and mounted for rotation therewith about said axis of rotation;
   (e) means connected to said lift rotor to cause said lift rotor to rotate about said axis of rotation to generate lift and thereby produce a resultant rotor lift vector,
   (f) means to selectively position the resultant rotor lift vector between outer and inner limits between said axis of rotation and the blade tips to produce optimum lift-to-drag ratio wherein said outer limit is defined by the formula:

$$P=53\mu: \text{ where } 0\leq\mu\leq.8; \text{ and}$$
$$P=37.5e^{[.7(.8-\mu)]}+5, \text{ where } \mu>.8$$

and wherein said inner limit is defined by the formula:

$$P=40\mu; \text{ where } 0\leq\mu\leq.8; \text{ and}$$
$$P=37.5e^{[.7(.8-\mu)]}-5, \text{ where } \mu>.8$$

where P is the resultant rotor lift vector offset in percent of rotor radius, $\mu$ is the advance ratio, i.e., the ratio of helicopter forward speed to rotational blade tip speed, and $e$ is the base of the natural logarithms,
   (g) and means to cancel the roll moment established by the resultant rotor lift vector so offset.

15. The method of flying a helicopter including the steps of causing the helicopter rotor to rotate about an axis of rotation, varying the angle of attack of the rotor blades to establish forward flight speed and thereby establish a resultant rotor lift vector in offset relation to the rotor axis of rotation, varying the angle of attack of the advancing blades in a first direction and the angle of attack of the retreating blades in the opposite direction to selectively position the resultant rotor lift vector established by the rotating rotor substantially in accordance with the formula:

$$P=47\mu; \text{ where } 0\leq\mu\leq.8; \text{ and}$$
$$P=37.5e^{[.7(.8-\mu)]}; \text{ where } \mu>.8$$

where P is the rotor resultant lift vector offset out the advancing blades in percent of rotor radius, $\mu$ is the advance ratio, i.e., the ratio of helicopter forward speed to rotational blade tip speed, and $e$ is the base of the natural logarithms, and establishing a cancelling roll moment to the roll moment established by the selectively positioned resultant lift vector.

16. The method of flying a double-rotor helicopter to produce maximum lift at all flight speeds comprising causing the rotors to rotate in opposite directions, varying the angle of attack of the blades of the rotors to establish forward flight speed and thereby establish a result rotor lift vector for each rotor in offset relation to the rotor axis of rotation, varying the angle of attack of the advancing blades in a first direction and the angle of attack of the retreating blades in the opposite direction to selectively positon the offset resultant lift vectors so as to cancel the roll moment created thereby.

17. The method of flying a double-rotor helicopter to produce optimum lift-to-drag ratio at all flight speeds comprising causing the rotors to rotate in opposite directions about their axes of rotation, then varying the angle of attack of the rotor blades to establish forward flight speed and to produce resultant rotor lift vectors oppositely offset from the rotor axes of rotation, varying the angle of attack of the advancing blades of the two rotors in a first direction and varying the angle of attack of the retreating blades of the two rotors in the opposite direction to selectively position the offset resultant rotor lift vectors substantially in accordance with the formula:

$$P=47\mu; \text{ where } 0\leq\mu\leq.8; \text{ and}$$
$$P=37.5e^{[.7(.8-\mu)]}; \text{ where } \mu>.8$$

where P is the rotor resultant lift vector offset in percent of rotor radius, $\mu$ is the advance ratio, i.e., the ratio of helicopter forward speed to blade tip speed, and $e$ is the base of the natural logarithms, to thereby produce optimum lift-to-drag ratio in each rotor and cancelling roll moments.

18. The method according to claim 16 wherein the resultant rotor lift vector is offset on each rotor substantially in accordance with the formula:

$$P=47\mu; \text{ where } 0\leq\mu\leq.8; \text{ and}$$
$$P=37.5e^{[.7(.8-\mu)]}; \text{ where } \mu>.8$$

where P is the resultant rotor lift vector offset in percent of rotor radius, $\mu$ is the advance ratio, i.e., the ratio of helicopter forward speed to rotational blade tip speed, and $e$ is the base of the natural logarithms.

19. The method of flying a double-rotor helicopter to produce optimum lift-to-drag ratio at all flight speeds comprising causing the rotors to rotate in opposite directions about their axes of rotation, then varying the angle of attack of the rotor blades to establish forward flight speed and to produce resultant rotor lift vectors oppositely offset from the rotor axes of rotation, varying the angle of attack of the advancing blades of the two rotors in a first direction and varying the angle of attack of the retreating blades of the two rotors in the opposite direction to cause the resultant lift vectors of said rotors to be offset toward the advancing blade tips between inner and outer limits wherein the outer limit is defined by the formula:

$$P=53\mu; \text{ where } 0\leq\mu\leq.8; \text{ and}$$
$$P=37.5e^{[.7(.8-\mu)]}+5, \text{ where } \mu>.8$$

and wherein the inner limit is defined by the formula:

$$P=40\mu; \text{ where } 0\leq\mu\leq.8; \text{ and}$$
$$P=37.5e^{[.7(.8-\mu)]}-5, \text{ where } \mu>.8$$

where P is the rotor resultant lift vector offset in percent of rotor radius, $\mu$ is the advance ratio, i.e., the ratio of helicopter forward speed to blade tip speed, and $e$ is the base of the natural logarithms, to thereby produce optimum lift-to-drag ratio in each rotor and cancelling roll moments.

References Cited

UNITED STATES PATENTS

| | | | |
|---|---|---|---|
| 2,473,331 | 6/1949 | Donley | 170—135.26 |
| 3,126,966 | 3/1964 | Agamian | 170—135.24 |

MILTON BUCHLER, *Primary Examiner.*

P. E. SAUBERER, *Assistant Examiner.*